Aug. 12, 1958 H. G. EVERS ET AL 2,847,509
PARTY LINE PAYSTATION IDENTIFICATION
Filed Nov. 9, 1955
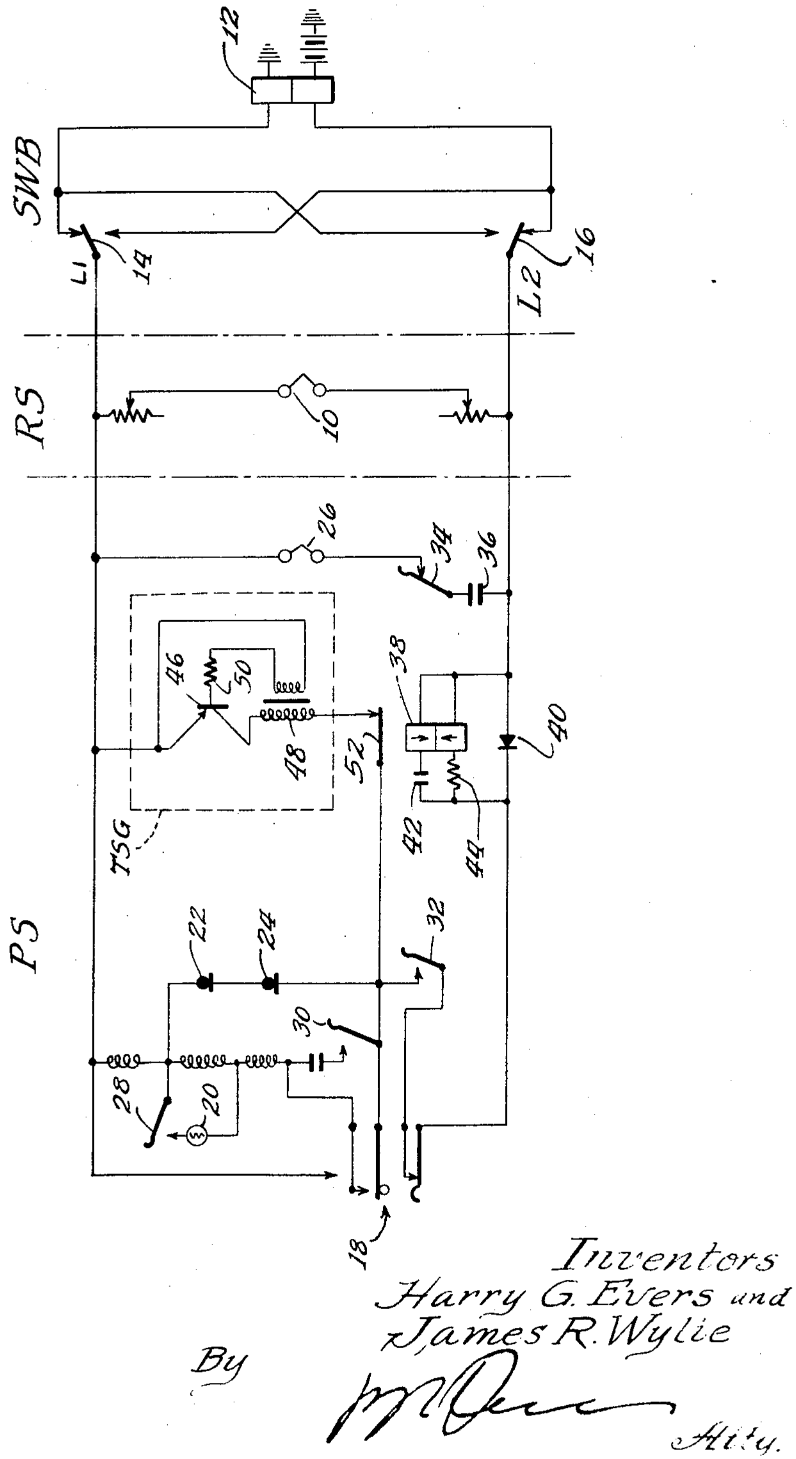
Inventors
Harry G. Evers and
James R. Wylie
By
Atty.

United States Patent Office 2,847,509

Patented Aug. 12, 1958

2,847,509

PARTY LINE PAYSTATION IDENTIFICATION

Harry G. Evers, Genoa, and James R. Wylie, Belvidere, Ill., assignors to Leich Electric Company, Genoa, Ill., a corporation of Illinois Application November 9, 1955, Serial No. 545,874

9 Claims. (Cl. 179—17)

This invention relates to telephone party lines and is particularly concerned with a circuit arrangement for identifying paystations connected to party lines.

An object of the invention is to provide a circuit arrangement which makes it possible to mix regular party line subscriber stations, for example, flat rate stations and paystations on the same party line, that is, to provide both classes of services on one and the same party line. The identification of a calling station as a paystation is necessary so as to enable the exchange equipment which may for example be controlled by an operator, to supervise the deposit of coins to pay for the charges of paystation calls.

The above indicated general object is also realized by arrangements described in copending application Serial No. 539,769, filed October 11, 1955. The prior arrangements utilize a tone generator included in the equipment of a paystation, such tone generator comprising a relay which is responsive to a call initiated at the paystation connected across the line conductors of the corresponding party line, and circuit means, responsive to battery reversal on the line incident to answer supervision, for causing such relay to operate as a buzzer so as to generate a characteristic tone which is transmitted over the line conductors to the switchboard of the associated exchange for the purpose of identifying the call as having originated at the corresponding paystation.

The present invention as distinguished from the prior arrangement proposes to provide at a party line paystation a transistor oscillator operating as a tone generator, a control relay, and means for connecting said control relay and said transistor oscillator in separate circuits across the line conductors when a call is initiated at the corresponding paystation, said transistor oscillator being responsive to battery reversal on the line conductors incident to answer supervision operative to generate oscillations and thereby current variations in the line which produce at the exchange a characteristic tone constituting the paystation signal, and said control relay being with a predetermined delay operative to disconnect said transistor oscillator thereby terminating the paystation signal.

The arrangement according to the invention is less sensitive to variations in the loop resistance of the line and provides an improved tone quality. Among other advantages may be mentioned circuit simplifications, also saving of space, and the use of a simple control relay which operates only once for each paystation call as compared with the buzzing operation of the relay used in the prior arrangement.

The various detail objects and features will appear from the description of an embodiment which is rendered below with reference to the accompanying drawing showing, as an example, how the invention may be realized in practice.

Known details have been partly omitted or shown simplified so as to keep the drawing simple.

Referring now to the drawing, reference characters PS indicate a party line paystation; characters TSG indicate a dotted line rectangle enclosing the elements of the tone signal generator disposed at the paystation; characters RS indicate a regular party line station, showing of such station only the ringer 10 which may be connected across the line conductors when the handset is in place; and characters SWB indicate exchange switchboard elements including a battery feed relay 12 and line reversal contacts 14 and 16.

The line reversal contacts 14 and 16 are operated in known manner by a known relay (not shown) when the operator at the switchboard SWB answers a call. The battery feed relay 12 operates in known manner and for well-known purposes. Other switchboard elements have no direct bearing on the invention and have been omitted as they are likewise well known and understood.

The regular party line station RS comprises in addition to the ringer 10 usual elements which are as to structure and operation well known and understood and which have been omitted as they have no direct bearing on the invention.

The paystation PS is connected to the same party line as the regular station RS, the line conductors L1 and L2 terminating in the battery reversal contacts 14 and 16.

It is understood, of course, that several regular party line stations may in accordance with known practice be connected to the party line and more than one paystation may likewise to provided if desired.

The paystation PS comprises in the illustrated example principal elements including a dial 18; a receiver 20; a transmitter 22; a coin signal transmitter 24; a ringer 26; and the usual induction coil, all as shown in the drawing. A dial has been shown but it is understood that the station may be a manual station. Numerals 28, 30, 32 and 34 indicate hookswitch contacts, shown in normal positions, that is, in positions in which they are when the handset is in place.

The paystation ringer 26 may be connected to the party line conductor L1 as shown. Accordingly, the paystation PS may be called from the switchboard SWB by transmitting ringing current over the party line conductors L1 and L2 to operate the ringer 26 in a circuit involving the capacitor 36 and the hookswitch contact 34.

It is understood that known elements of the paystation may be provided in circuits differing from those of the schematic representation shown in the drawing to give an example.

In addition to the above-described elements, the paystation PS is in accordance with the invention provided with a tone signal generator comprising a transistor 46 disposed in an oscillating circuit including a transformer 48 having a primary winding connected respectively with the transistor collector electrode and a contact 52 governed by a control relay and a secondary winding connected over a resistor 50 with the transistor base electrode and on the other side with the transistor emitter electrode. The operation of the tone generator is governed by the control relay 38, such relay having two opposing windings and circuit means therefor including a rectifier 40, a capacitor 42, and a resistor 44. The rectifier 40 is connected in the line conductor L2 and extends in parallel with the windings of relay 38. The elements of the tone generator TSG extend normally in parallel with paystation elements 24, 22 and a winding of the induction coil. The tone generator TSG and the control relay 38 are normally disconnected at the normally open hookswitch contact 32.

The operation is as follows:

When a call is made from the paystation PS, the hookswitch contacts 28, 30, 32 will be closed and hookswitch contact 34 will be opened. Hookswitch contact 28 closes a circuit to the receiver 20; contact 30 closes a point in the listening circuit; contact 34 opens to disconnect the ringer 26; and hookswitch contact 32 connects the line conductors L2 and L1 in a loop circuit extending over a dial contact, coin signal transmitter 24, transmitter 22 and a winding of the induction coil, thereby connecting the relay 38 and its control elements across the line conductors. The tone generator is at the same time connected in the loop circuit in parallel with the coin signal transmitter 24 and transmitter 22 over contact 52 of relay 38.

The rectifier 40 shunts the relay 38, and current now flowing from the exchange battery over line conductor L2, hookswitch contact 32, coin signal transmitter 24, transmitter 22 and back over line conductor L1 is accordingly not effective to operate relay 38 and such relay remains initially at normal. The switchboard operator however receives in known manner a signal informing her that a call has been initiated on the party line.

The operator, upon answering the call, causes in known and well understood manner reversal of the battery feed by actuation of the contacts 14 and 16. Current now flows over the line conductors in reverse direction, thus making the rectifier 40 ineffective and allowing energization of the windings of relay 38 and initiating charging of the capacitor 42. The windings oppose each other and prevent operative actuation of relay 38 for a delay interval determined by the control circuit including the magnitudes of the capacitor 42 and the resistor 44. The paystation identification tone signal is during such delay interval generated and transmitted to the exchange as follows:

Reversal of battery when the operator answers the call applies positive bias potential over line conductor L1 to the emitter of the transistor 46 thus permitting collector current to flow in a circuit including contact 52 of relay 38, the primary winding of transformer 48, and the electrodes of transistor 46. Variations in the said current generate a similarly varying current in the secondary winding of the transformer which is connected in the base-emitter circuit of the transistor. The turns ratio of the transformer 48 permits matching of the low input impedance of the transistor. The resulting current signal is amplified by the transistor and applied to the primary transformer winding, thus providing a positive feedback which produces and sustains oscillations. The tone signal thus generated is transmitted to the exchange over the line as a paystation identification signal.

When the capacitor 42 in series with the upper winding of relay 38 is nearly charged, the flux in such winding is reduced to a value insufficient to oppose the flux produced in the lower winding, and relay 38 operates, opening its contact 52 to disconnect the tone generator, thereby terminating the transmission of the paystation identification signal.

Relay 38 remains operated for the duration of the call. Voice currents pass through relay 38 with relatively small loss because of the differential connection of its windings.

The battery connection is upon conclusion of the call returned to normal by restoration of contacts 14 and 16 to the positions shown. The rectifier 40 will accordingly be again operative as a shunt for the control circuit and relay 38 will restore and close its contact 52 to prepare for reconnection of the tone generator incident to a subsequent call.

The duration of the paystation identification signal corresponds substantially to the length of the delay interval of relay 38 which in turn is determined by the characteristics of the control circuit elements 42, 44 and also the windings of relay 38. The intensity of the tone signal will depend on the amplification characteristic of the transistor. The frequency of the oscillations generated and accordingly the frequency of the tone signal is sufficiently high to produce a distinctive tone to provide for the desired paystation identification.

It may be mentioned in conclusion that the arrangement according to the invention may be provided for semi-automatic or full-automatic or for manual operation. The term "switchboard," unless otherwise limited is intended to mean exchange equipment whether attended by an operator or not. It is further understood that the party line may terminate in an exchange comprising selection means including selectors and connectors; in other words, the invention is not inherently limited for use either in small or large capacity systems.

Changes may be made within the scope and spirit of the appended claims.

We claim:

1. In a telephone system having a party line and line conductors extending therefrom to an associated exchange, a paystation connected to said party line, a control relay connected to one of the line conductors of said paystation, hookswitch operated contact means for connecting said control relay in a loop circuit including said line conductors when a call is initiated at said paystation to cause initial current flow over said loop circuit for signaling to the exchange the initiation of said call, rectifier means for inhibiting the operation of said control relay responsive to said initial current flow, a tone generator comprising a transistor and cooperating elements forming an oscillating circuit therewith, circuit means comprising a contact governed by said control relay for connecting said tone generator in said loop circuit, means being operative at said exchange subsequent to closure of said loop circuit for reversing the current flow over said line conductors, said current reversal rendering said rectifier ineffective to cause operative current flow through said control relay, means for delaying the operative response of said control relay for a predetermined interval, said current reversal being operative to cause operation of said transistor oscillating circuit for generating a tone signal which is transmitted to said exchange for the purpose of identifying the call as a paystation call, said control relay operating at the conclusion of said delay interval to actuate said contact for the purpose of disconnecting said tone generator to terminate transmission of the tone signal generated thereby.

2. A system and cooperation of parts according to claim 1, wherein said control relay remains operated for the duration of said call.

3. A system and cooperation of parts according to claim 2, wherein said control relay comprises two opposing windings, said delay means comprising RC-elements cooperating with said windings.

4. A system and cooperation of parts according to claim 3, wherein said elements cooperating with said transistor include a transformer having a primary winding respectively interconnected with said contact and a transistor electrode and having a secondary winding respectively interconnected with the base of said transistor and with another electrode thereof.

5. A system and cooperation of parts according to claim 4, wherein said control relay is connected in said loop circuit over said hookswitch means in series with paystation elements disposed in the talking path, said tone generator elements being connected over the contact of said control relay in parallel with said paystation elements.

6. In a telephone exchange system having line conductors connected to a paystation, a tone generator connectible to said paystation for generating a characteristic tone signal for identifying paystation calls, said tone generator having a transistor and cooperating elements forming an oscillating circuit therewith, first circuit means for controlling the predetermined duration of generation of said tone signal said first circuit means including capacitor-resistor means, and second circuit means for applying said tone signal to said line conductors for transmission to the exchange.

7. In a telephone exchange system having line conductors connected to a paystation, a tone generator connectible to said paystation for generating a characteristic tone signal for identifying paystation calls, said tone generator having a transistor and cooperating elements forming an oscillating circuit therewith, said cooperating elements including a transformer having a primary winding connected with an electrode of said transistor, first circuit means for controlling the predetermined duration of generation of said tone signal, and second circuit means including a rectifier for applying said tone signal to said line conductors for transmission to the exchange.

8. In a telephone exchange system having line conductors connected to a paystation, a tone generator connectible to said paystation for generating a characteristic tone signal for identifying paystation calls, said tone generator having a transistor and cooperating elements forming an oscillating circuit therewith, said cooperating elements including a transformer having a primary winding connected with an electrode of said transistor, first circuit means for controlling the duration of generation of said tone signal, said first circuit means effective initially to connect said primary winding to one of said conductors, and second circuit means for applying said tone signal to said conductors for transmission to the exchange, said second circuit means having a connection extending from another electrode of said transistor to another of said conductors.

9. In a telephone exchange system having line conductors connected to a paystation, a tone generator connectible to said paystation for generating a characteristic tone signal for identifying paystation calls, said tone generator having a transistor and cooperating elements forming an oscillating circuit therewith, said cooperating elements including a transformer having a primary winding connected with an electrode of said transistor, first circuit means for controlling the predetermined duration of generation of said tone signal, said first circuit means including a relay operable in one direction of current flow and inoperable in the opposite direction of current flow, second circuit means for applying said tone signal to said line conductors for transmission to said exchange, and capacitor-resistor means in circuit with said relay for determining the duration of said tone signal.

References Cited in the file of this patent

UNITED STATES PATENTS

| | | |
|---|---|---|
| 1,792,651 | Mathias | Feb. 17, 1931 |
| 1,864,524 | Bragg | June 28, 1932 |
| 2,228,113 | Hersey | Jan. 7, 1941 |
| 2,277,228 | Hecht | Mar. 24, 1942 |
| 2,283,610 | Mohr | May 19, 1942 |
| 2,729,703 | Faulkner | Jan. 3, 1956 |
| 2,782,259 | Dimond | Feb. 19, 1957 |